(12) United States Patent
Patel

(10) Patent No.: US 7,904,755 B2
(45) Date of Patent: Mar. 8, 2011

(54) EMBEDDED SOFTWARE TESTING USING A SINGLE OUTPUT

(75) Inventor: Jeyur Patel, South Harrow (GB)

(73) Assignee: Infineon Technologies AG, Neubiberg (DE)

( * ) Notice: Subject to any disclaimer, the term of this patent is extended or adjusted under 35 U.S.C. 154(b) by 357 days.

(21) Appl. No.: 12/130,201

(22) Filed: May 30, 2008

(65) Prior Publication Data

US 2009/0300402 A1    Dec. 3, 2009

(51) Int. Cl.
*G06F 11/00* (2006.01)

(52) U.S. Cl. ............................... 714/37; 714/733

(58) Field of Classification Search .............. 714/37, 714/30, 38, 47, 45, 51, 733, 734
See application file for complete search history.

(56) References Cited

U.S. PATENT DOCUMENTS

| | | | |
|---|---|---|---|
| 6,496,953 B1 * | 12/2002 | Helland | 714/744 |
| 6,686,759 B1 * | 2/2004 | Swamy | 324/765 |
| 7,057,411 B2 | 6/2006 | Her et al. | |
| 2004/0193977 A1 | 9/2004 | Kejariwal et al. | |
| 2005/0071719 A1 * | 3/2005 | Faust et al. | 714/741 |
| 2006/0184847 A1 | 8/2006 | Song et al. | |
| 2006/0190215 A1 | 8/2006 | Hsieh et al. | |
| 2008/0143381 A1 * | 6/2008 | Weinraub | 326/40 |
| 2009/0244966 A1 * | 10/2009 | Wilson et al. | 365/185.2 |

* cited by examiner

*Primary Examiner* — Dieu-Minh Le
(74) *Attorney, Agent, or Firm* — Dicke, Billig & Czaja, PLLC

(57) ABSTRACT

An integrated circuit includes a processor and a circuit. The processor is configured to execute software. The software includes a plurality of software events. The circuit is configured to output a pulse on a single pin or pad of the integrated circuit in response to executing each software event. A pulse width of each pulse identifies a software event.

25 Claims, 6 Drawing Sheets

| COUNT VALUE | SOFTWARE EVENT UNDER OBSERVATION |
|---|---|
| 1 | SOFTWARE PATH 3 START |
| 2 | SOFTWARE PATH 3 END |
| 3 | SOFTWARE PATH 1 START |
| 4 | SOFTWARE PATH 2 START |
| 5 | SOFTWARE PATH 1 END |
| 6 | RESERVED FOR FUTURE |
| 7 | SOFTWARE PATH 2 END |
| 8 | SOFTWARE EVENT X |
| 9 TO 17 | RESERVED FOR FUTURE |
| 18 | SOFTWARE EVENT Y |
| 19 AND UP | NOT USED |

EMBEDDED SOFTWARE TESTING USING A SINGLE OUTPUT

BACKGROUND

An integrated circuit including a processor, such as a micro-processor, micro-controller, or system on chip (SoC), typically executes embedded system software stored in a memory of the integrated circuit. The system software typically includes a plurality of critical software events and/or paths. During testing and debugging of the system software, the timing of each critical software event and/or path, the order of each critical software event and/or path, and the time between each critical software event and/or path is useful for determining whether the system software is operating correctly. In addition, to reduce the size and cost of an integrated circuit, the number of input/output pads or pins of the integrated circuit should be minimized.

For these and other reasons, there is a need for the present invention.

SUMMARY

One embodiment provides an integrated circuit. The integrated circuit includes a processor and a circuit. The processor is configured to execute software. The software includes a plurality of software events. The circuit is configured to output a pulse on a single pin or pad of the integrated circuit in response to executing each software event. A pulse width of each pulse identifies a software event.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that the features of the various exemplary embodiments described herein may be combined with each other, unless specifically noted otherwise.

Figure 1:
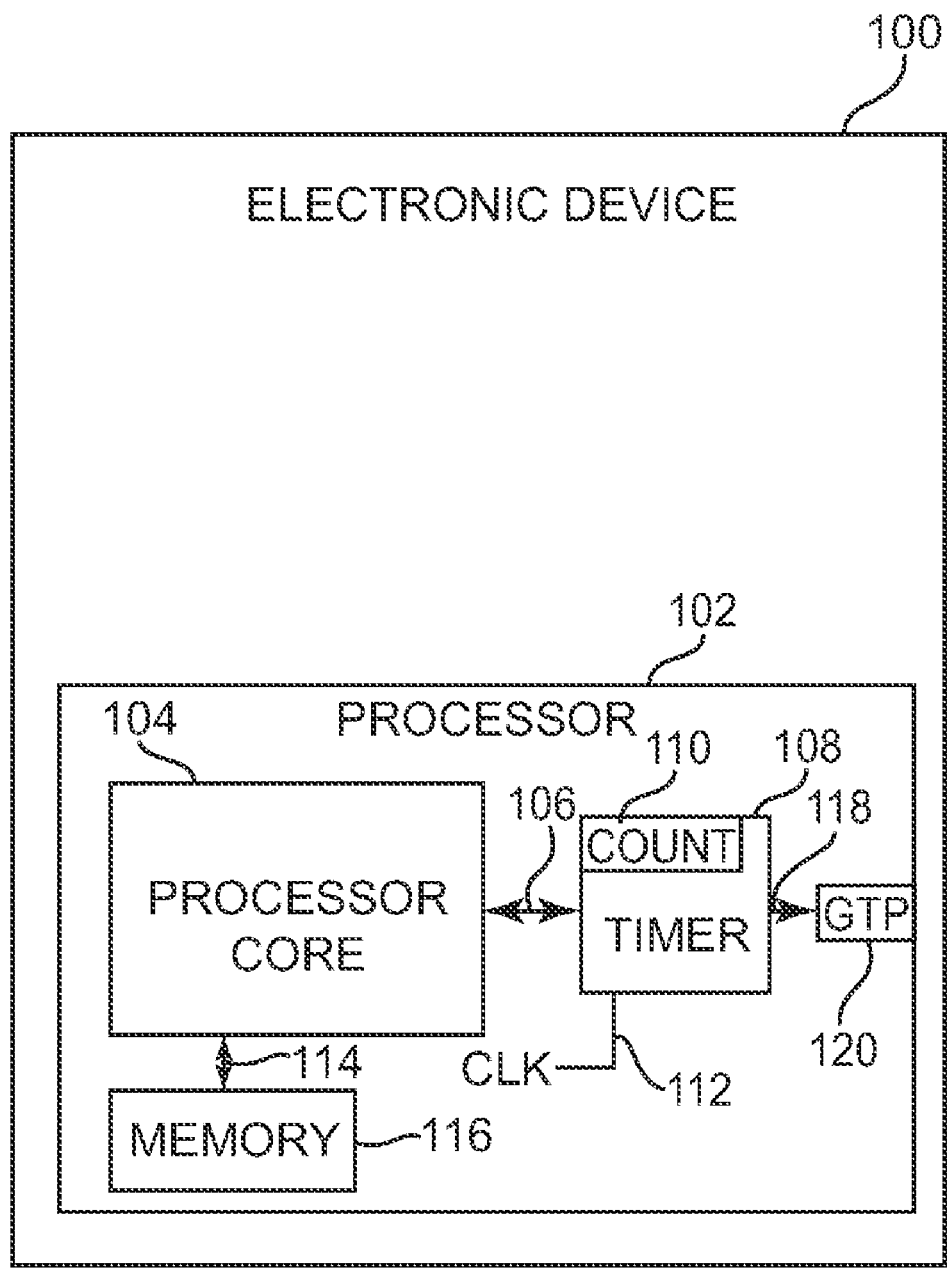
FIG. 1 is a block diagram illustrating one embodiment of a system including an integrated circuit for executing embedded software.

FIG. 1 is a block diagram illustrating one embodiment of a system 100 including an integrated circuit 102 for executing embedded software. System 100 is an electronic device, such as a computer, a micro-computer, a portable electronic device (e.g., cellular phone, digital music player, digital video player, digital camera, personal digital assistant (PDA), game system, etc.), or another suitable electronic device. Integrated circuit 102 includes a processor, such as a micro-processor, a micro-controller, a system-on-chip (SOC), or another suitable logic device. Processor 102 includes a processor core 104, a memory 116, and a timer 108.

Processor 102 includes a single general purpose test pin or pad (GTP) 120 for real-time testing and debugging of embedded software executed by processor 102. GTP 120 outputs a pulse for indicating the execution of selected software events within processor 102. The pulse has a different pulse width for each selected software event to uniquely identify each software event. In one embodiment, the software events include the beginning and end of selected software paths. The pulses provided on GTP 120 can be analyzed by an oscilloscope, a logic analyzer, or other suitable test equipment to determine the timing of each selected software event and the timing relationships between the selected software events. The timing information can then be used to determine whether the embedded software is operating correctly.

As used herein, the term "electrically coupled" is not meant to mean that the elements must be directly coupled together and intervening elements may be provided between the "electrically coupled" elements.

Processor core 104 is electrically coupled to timer 108 through signal path 106 and to memory 116 through signal path 114. Timer 108 receives a clock (CLK) signal on CLK signal path 112 and provides a test signal to GTP 120 through signal path 118. In one embodiment, processor core 104 includes a central processing unit (CPU). Memory 116 stores embedded software, which is executed by processor core 104. Memory 116 includes an electrically erasable and programmable read-only memory (EEPROM), FLASH, or another suitable memory.

Processor core 104 executes embedded software. Processor core 104 reads and writes count 110 of timer 108 through signal path 106 in response to executing selected software events. In one embodiment, in response to executing a selected software event, processor core 104 sets count 110 of timer 108 to a value other than zero. In another embodiment, in response to executing a selected software event, processor core 104 reads count 110 of timer 108 and does not set count 110 unless the count equals zero. In this embodiment, processor core 104 delays the execution of the selected software event until count 110 equals zero. Once count 110 equals zero, processor core 104 sets count 110 of timer 108 to a value other than zero and continues execution of the selected software event.

Processor core 104 sets count 110 of timer 108 to a different value for each selected software event. In one embodiment, each selected software event to be monitored includes code to set count 110 of timer 108 to a unique value to identify the selected software event. For example, a first count value indicates the execution of a first software event. A second count value indicates the execution of a second software event. A third count value indicates the execution of a third software event, and so on.

Timer 108 includes an 8-bit timer, 16-bit timer, 32-bit timer, or other suitably sized timer. In response to count 110 of timer 108 being set to a value other than zero, timer 108 outputs a logic high signal on signal path 118 to GTP 120. Timer 108 decrements count 110 in response to each cycle of the clock signal on CLK signal path 112. Once count 110 of timer 108 reaches zero, timer 108 outputs a logic low signal on signal path 118 to GTP 120. Therefore, timer 108 outputs a pulse to GTP 120 having a pulse width equal to the initial count value set by processor core 104. In another embodiment, timer 108 outputs a logic low signal on signal path 118 to GTP 120 in response to count 110 of timer 108 being set to a value other than zero, and timer 108 outputs a logic high signal on signal path 118 to GTP 120 once count 110 of timer 108 reaches zero.

In another embodiment, timer 108 is a general purpose timer of processor 102 and GTP 120 is a general purpose input/output pad or pin (GPIO) of processor 102. In this embodiment, the timer is initialized as a count down timer and generates an interrupt when the count of the timer reaches zero. In response to a software event, processor core 104 sets the count of the timer to identify the software event, starts the timer, and outputs a logic high signal on the GPIO. In one embodiment, processor core 104 checks the count of the timer to make sure the count is zero before setting the count. Once of the count of the timer reaches zero, the timer generates an interrupt. In response to the interrupt, processor core 104 executes an interrupt routine that stops the timer and outputs a logic low signal on the GPIO.

Figure 2:
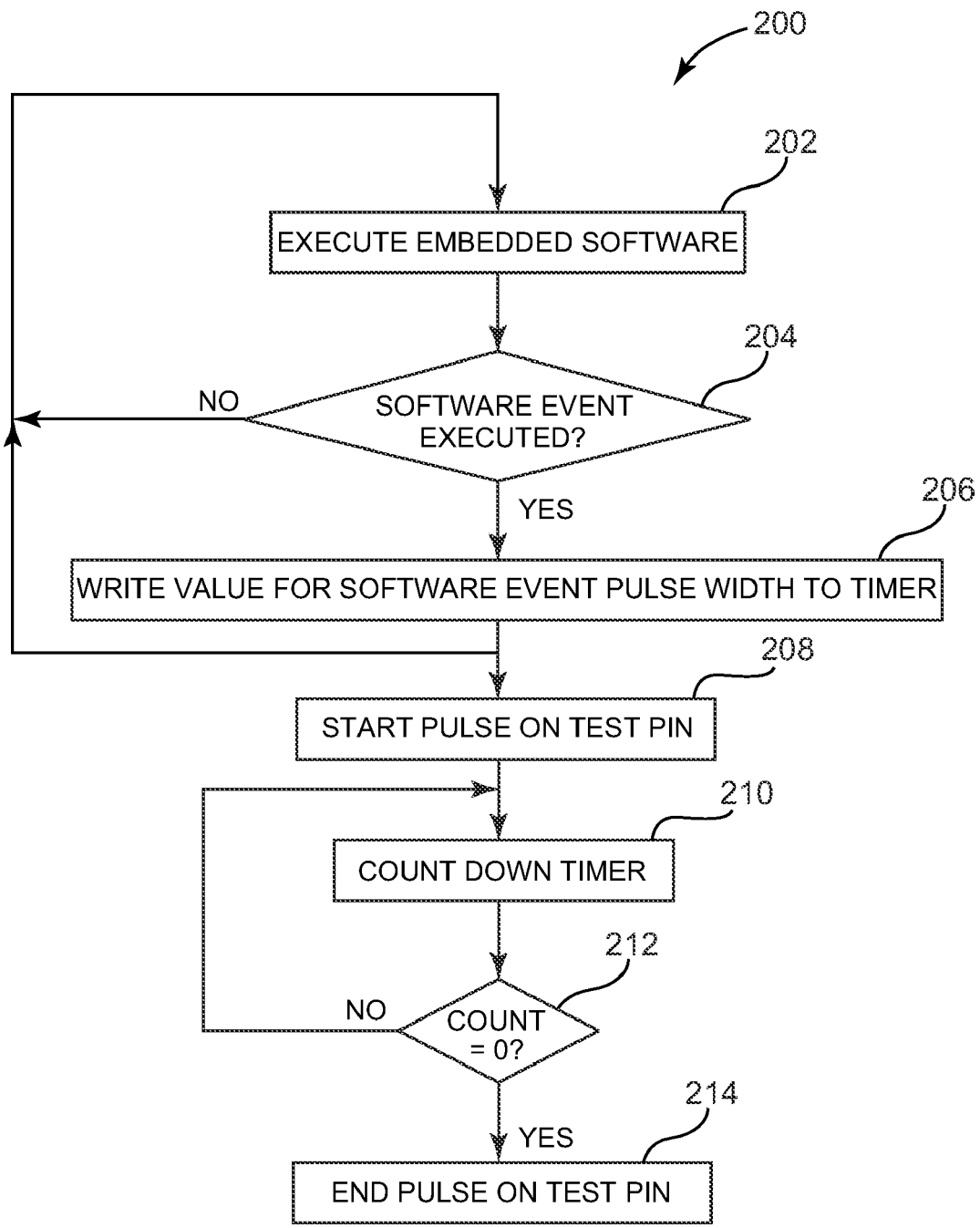
FIG. 2 is a flow diagram illustrating one embodiment of a method for testing embedded software.

FIG. 2 is a flow diagram illustrating one embodiment of a method 200 for testing embedded software, such as embedded software executed by processor 102 previously described and illustrated with reference to FIG. 1. At 202, processor core 104 executes embedded software. At 204, if processor core 104 is not executing a selected software event, then processor core 104 continues executing the embedded software at 202 until a selected software event is executed at 204. At 204, if processor core 104 executes a selected software event, then at 206 processor core 104 writes the pulse width value for the software event (i.e., count 110 for the software event) to timer 108 and continues executing the embedded software at 202.

At 208, timer 108 starts the pulse on GTP 120 by applying a logic high signal on signal path 118. At 210, timer 108 counts down in response to each cycle of the clock signal on CLK signal path 112. At 212, if the count of timer 108 does not equal zero, timer 108 continues counting down at 210 until the count equals zero. At 212, once the count of timer 108 equals zero, timer 108 ends the pulse on GTP 120 by applying a logic low signal on signal path 118 at 214. In one embodiment, blocks 202, 204, and 206 are executed by software, and blocks 208, 210, 212, and 214 are executed by hardware. In another embodiment, blocks 204 and 206 are also executed by hardware.

Figure 3:
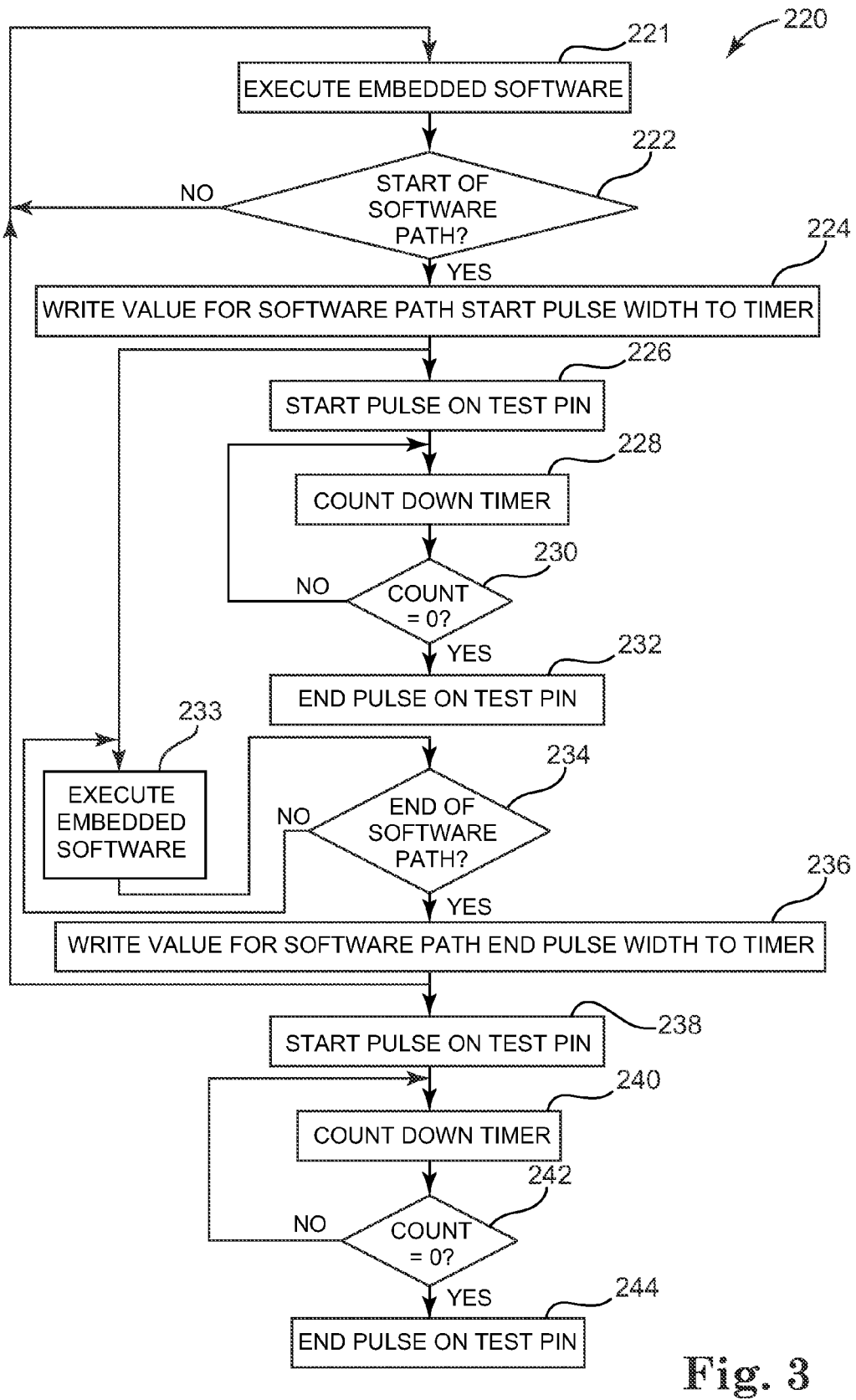
FIG. 3 is a flow diagram illustrating another embodiment of a method for testing embedded software.

FIG. 3 is a flow diagram illustrating another embodiment of a method 220 for testing embedded software, such as embedded software executed by processor 102 previously described and illustrated with reference to FIG. 1. At 221, processor core 104 executes embedded software. At 222, if processor core 104 is not executing the start of a selected software path, then processor core 104 continues executing the embedded software at 221 until processor core 104 starts execution of a selected software path. Once processor core 104 starts execution of a selected software path, then at 224 processor core 104 writes the pulse width value for the software path start pulse (i.e., count 110 for the software path start pulse) to timer 108 and continues the execution of the software path at 233.

At 226, timer 108 starts the pulse on GTP 120 by applying a logic high signal on signal path 118. At 228, timer 108 counts down in response to each cycle of the clock signal on CLK signal path 112. At 230, if the count of timer 108 does not equal zero, timer 108 continues counting down at 228 until the count equals zero. At 230, once the count of timer 108 equals zero, timer 108 ends the pulse on GTP 120 by applying a logic low signal on signal path 118 at 232.

At 234, if processor core 104 is not executing the end of the selected software path, then processor core 104 continues executing the software path at 233 until processor core 104 executes the end of the software path. At 234, once processor core 104 executes the end of the software path, processor core 104 writes the pulse width value for the software path end pulse (i.e., count 110 for the software path end pulse) to timer 108 at 236 and continues executing the embedded software at 221.

At 238, timer 108 starts the pulse on GTP 120 by applying a logic high signal on signal path 118. At 240, timer 108 counts down in response to each cycle of the clock signal on CLK signal path 112. At 242, if the count of timer 108 does not equal zero, timer 108 continues counting down at 240 until the count equals zero. At 242, once the count of timer 108 equals zero, timer 108 ends the pulse on GTP 120 by applying a logic low signal on signal path 118 at 244. In one embodiment, blocks 221, 222, 224, 233, 234, and 236 are executed by software, and blocks 226, 228, 230, 232, 238, 240, 242, and 244 are executed by hardware.

Figure 4:
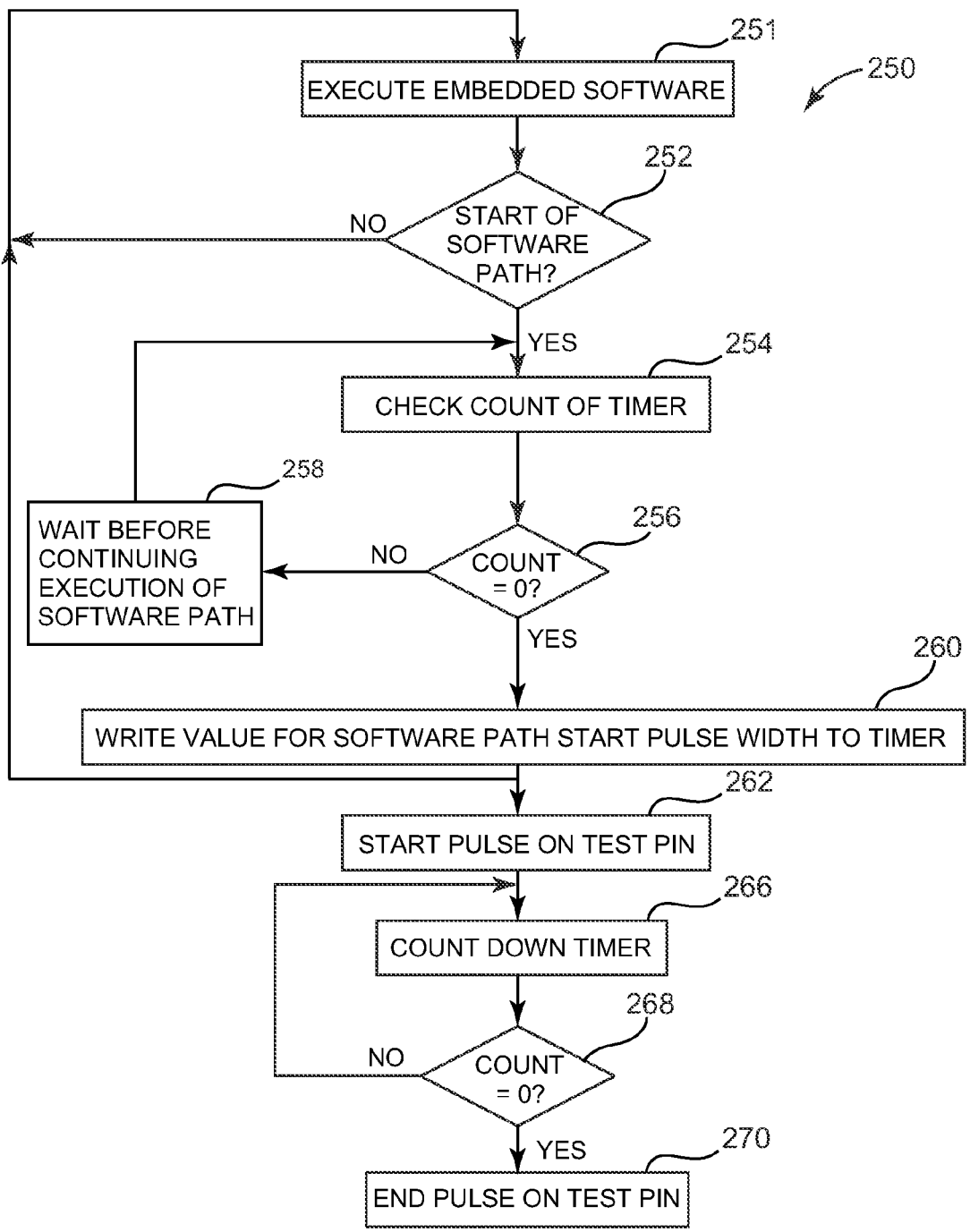
FIG. 4 is a flow diagram illustrating another embodiment of a method for testing embedded software.

FIG. 4 is a flow diagram illustrating another embodiment of a method 250 for testing embedded software, such as embedded software executed by processor 102 previously described and illustrated with reference to FIG. 1. At 251, processor core 104 executes embedded software. At 252, if processor core 104 is not executing the start of a selected software path, then processor core 104 continues executing the embedded software at 251 until processor core 104 starts execution of a selected software path. Once processor core 104 starts execution of a selected software path, then at 254 processor core 104 checks count 110 of timer 108. At 256, if the count of timer 108 does not equal zero, at 258 processor core 104 delays the execution of the software path and waits until the count of timer 108 equals zero. At 256, if the count of timer 108 equals zero, then at 260 processor core 104 writes the pulse width value for the software path start pulse (i.e., count 110 for the software path start pulse) to timer 108 and continues the execution of the software path at 251.

At 262, timer 108 starts the pulse on GTP 120 by applying a logic high signal on signal path 118. At 266, timer 108 counts down in response to each cycle of the clock signal on CLK signal path 112. At 268, if the count of timer 108 does not equal zero, timer 108 continues counting down at 266 until the count equals zero. At 268, once the count of timer 108 equals zero, timer 108 ends the pulse on GTP 120 by applying a logic low signal on signal path 118 at 270.

In one embodiment, processor core 104 checks count 110 of timer 108 in response to each selected software event (e.g. software event executed, start of software path, end of software path) and delays the execution of each selected software event until count 110 of timer 108 equals zero. Therefore, a pulse provided in response to a previous software event is terminated before another pulse is initiated. In one embodiment, blocks 251, 252, 254, 256, 258, and 260 are executed by software, and blocks 262, 266, 268, and 270 are executed by hardware.

Figure 5:
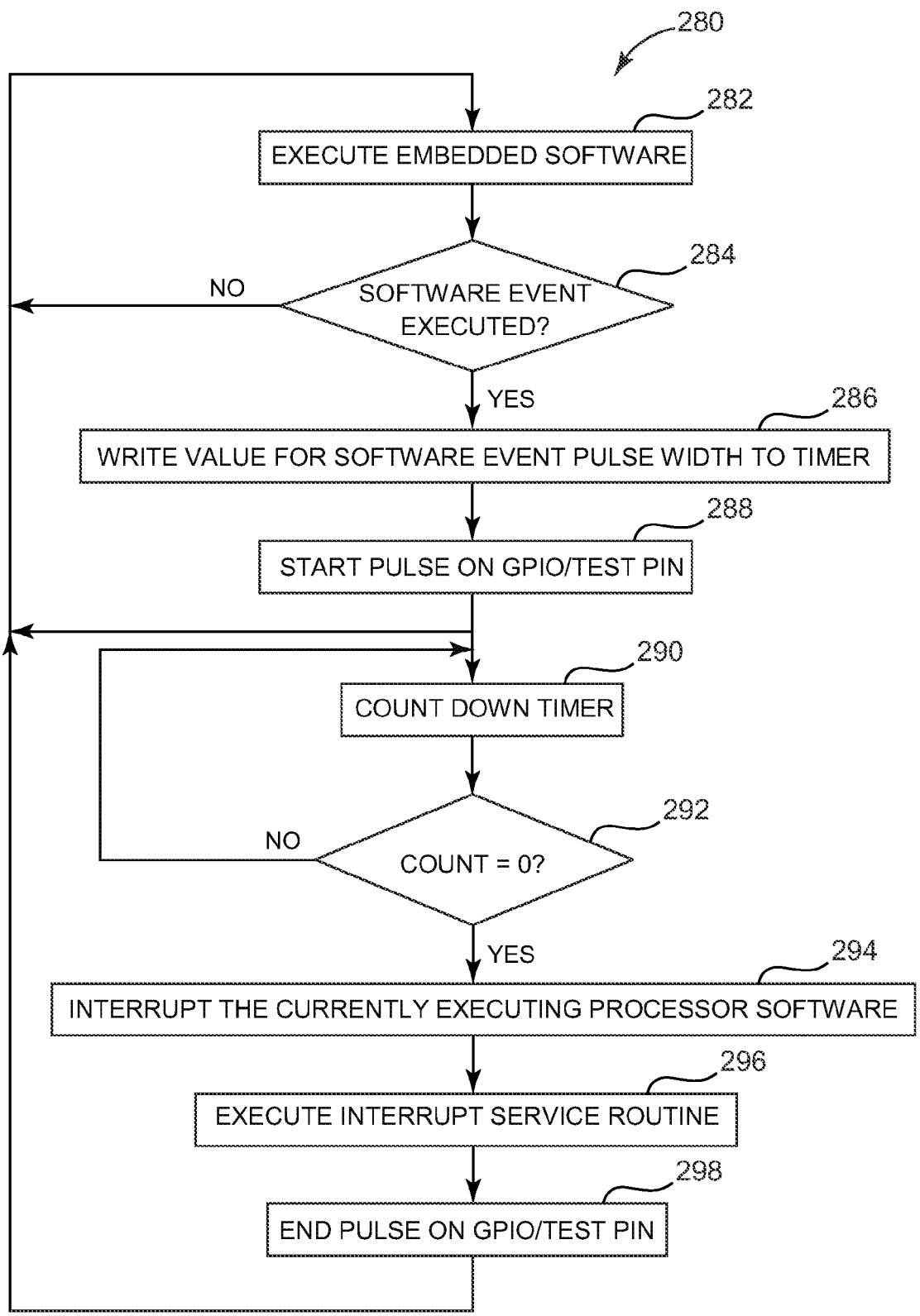
FIG. 5 is flow diagram illustrating another embodiment of a method for testing embedded software.

FIG. 5 is flow diagram illustrating another embodiment of a method 280 for testing embedded software, such as embedded software executed by processor 102 previously described and illustrated with reference to FIG. 1. At 282, processor core 104 executes embedded software. At 284, if processor core 104 is not executing a selected software event, then processor core 104 continues executing the embedded software at 282 until a selected software event is executed at 284. At 284, if processor core 104 executes a selected software event, then at 286 processor core 104 writes the pulse width value for the software event (i.e., count 110 for the software event) to timer 108. At 288, processor core 104 starts the pulse on GTP 120 or on a GPIO of processor 102 by applying a logic high signal to the pin and continues executing the embedded software at 282.

At 290, timer 108 counts down in response to each cycle of the clock signal on CLK signal path 112. At 292, if the count of timer 108 does not equal zero, timer 108 continues counting down at 290 until the count equals zero. Once the count of timer 108 equals zero at 292, at 294 timer 108 generates an interrupt to interrupt the currently executing processor software. At 296, in response to the interrupt, processor core 104 executes an interrupt service routine. At 298, the interrupt service routine is executed to end the pulse on GTP 120 or on the GPIO. After the interrupt service routine is executed, processor core 104 continues execution of the embedded software at 282. In one embodiment, blocks 282, 284, 286, 288, 294, 296, and 298 are executed by software, and blocks 290 and 292 are executed by hardware.

Figures 6, 7:
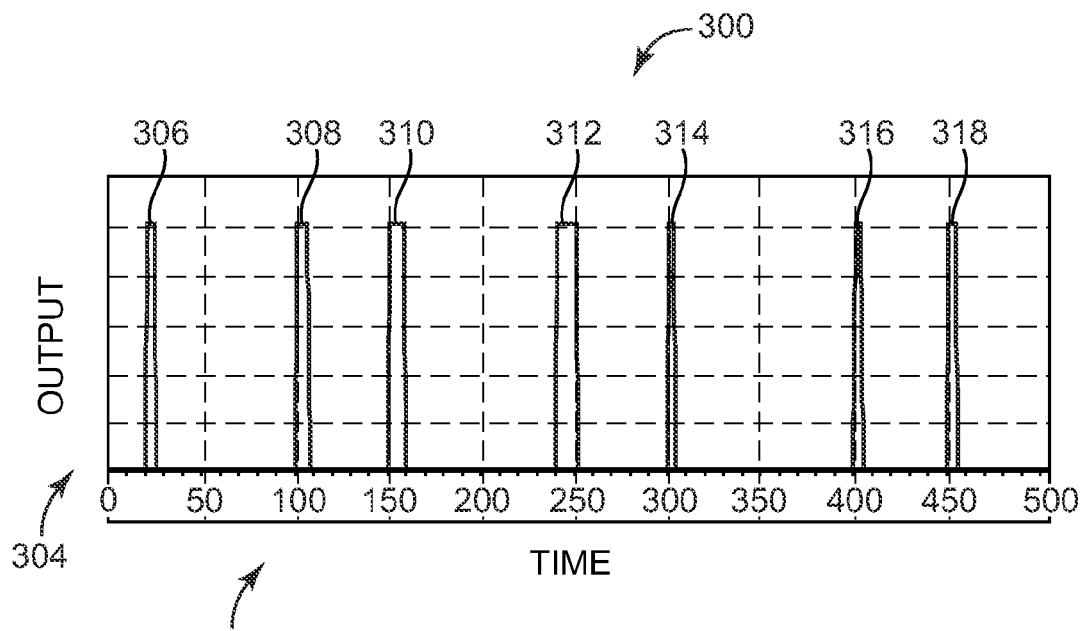
FIG. 6 is a chart illustrating one embodiment of an output signal on a test pad or pin of an integrated circuit in response to executing embedded software.
FIG. 7 is a table illustrating one embodiment of count values for different software events.

FIG. 6 is a chart 300 illustrating one embodiment of an output signal on GTP 120 of processor 102 in response to executing embedded software. Chart 300 includes time on x-axis 302 and the output on y-axis 304. Pulse 306 indicates the start of a first software path. Pulse 306 has a first pulse width. Pulse 308 indicates the end of the first software path. Pulse 308 has a second pulse width different from the first pulse width. Pulse 310 indicates the start of a second software path. Pulse 310 has a third pulse width different from the first and second pulse widths. Pulse 312 indicates the end of the second software path. Pulse 312 has a fourth pulse width different from the first, second, and third pulse widths. Pulse 314 indicates the start of a third software path. Pulse 314 has a fifth pulse width different from the first, second, third, and fourth pulse widths. Pulse 316 indicates the end of the third software path. Pulse 316 has a sixth pulse width different from the first, second, third, fourth, and fifth pulse widths. Pulse 318 indicates the start of the first software path. Pulse 318 has the first pulse width.

The output pulses can be received and analyzed by an external circuit, such as a logic analyzer, oscilloscope, or other suitable test equipment. From the pulses, the timing of the execution of each software path, the order of the execution of each software path, and the time between the execution of each software path can be determined. From the timing determinations, the embedded software can be tested and debugged. By varying the pulse width for each pulse to indicate which software event is executing, a single test pin or pad is used to indicate all the software events. Therefore, additional test pins or pads are not needed to test and debug the embedded software such that the size and cost of processor 102 may be reduced.

FIG. 7 is a table 350 illustrating one embodiment of count values 352 for different software events 354. In one embodiment, each monitored software event in the embedded software has a unique count value for identifying each software event. For example, software path 3 start has a count value of one, software path 3 end has a count value of 2, software event X has a count value of 8, etc. In one embodiment, the lower portion of the available count values are used and the upper portion of the available count values are not used such that the pulse widths are minimized. In one embodiment, shorter and/or more frequent software events are assigned lower count values than longer and/or less frequent software events. By using the lower portion of the available count values and by assigning lower count values to shorter and/or more frequent software events, the likelihood of having to delay execution of the embedded software to prevent overlapping pulses is minimized.

Embodiments provide an integrated circuit including a processor for executing embedded software. The integrated circuit includes a single test pad or pin for outputting pulses indicating the execution of monitored software events for real-time testing and debugging of the embedded software. Each pulse has a unique pulse width for identifying each monitored software event. Therefore, additional test pads or pins are not needed for testing or debugging such that the size and cost of the integrated circuit may be reduced.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. An integrated circuit comprising:
    a processor configured to execute software, the software comprising a plurality of software events; and
    a circuit configured to output a pulse on a single pin or pad of the integrated circuit in response to executing each software event, a pulse width of each pulse identifying a software event.

2. The integrated circuit of claim 1, wherein the pulse width is unique for each software event.

3. The integrated circuit of claim 1, wherein a first software event comprises starting execution of a software path and a second software event comprises ending execution of the software path.

4. The integrated circuit of claim 1, wherein the processor is configured to delay execution of a software event until a pulse provided in response to a previous software event terminates.

5. The integrated circuit of claim 1, wherein the circuit comprises a timer configured for setting the pulse width for each software event.

6. The integrated circuit of claim 5, wherein the processor is configured to write a value to the timer in response to executing each software event, and
    wherein the timer is configured to start the pulse on the pin or pad in response to the processor writing the value, count down from the value, and end the pulse on the pin or pad in response to the count reaching zero.

7. An integrated circuit comprising:
a processor configured to execute embedded software, the embedded software comprising a plurality of software paths; and
a circuit configured to output a first pulse having a first pulse width on a pin or pad of the integrated circuit in response to the processor starting execution of each software path and to output a second pulse having a second pulse width on the pin or pad in response to the processor ending execution of each software path, the first pulse width and the second pulse identifying a software path.

8. The integrated circuit of claim 7, further comprising:
a timer configured for setting the first pulse width and the second pulse width for each software path.

9. The integrated circuit of claim 8, wherein the processor is configured to write a first value to the timer to set the first pulse width in response to starting execution of each software path and to write a second value to the timer to set the second pulse width in response to ending execution of each software path.

10. The integrated circuit of claim 9, wherein the timer is configured to provide a logic high signal to the pin or pad in response to the first value being written, count down from the first value, and provide a logic low signal to the pin or pad in response to the count reaching zero.

11. The integrated circuit of claim 8, wherein the processor is configured to check a current value of the timer in response to starting execution of each software path, write a first value to the timer to set the first pulse width in response to the current value equaling zero, and wait to continue execution of a software path in response to the current value not equaling zero.

12. A system comprising:
an electronic device; and
an integrated circuit coupled to the electronic device, the integrated circuit comprising:
means for executing embedded software, the embedded software comprising a plurality of software events; and
means for outputting a pulse on a single pin or pad of the integrated circuit in response to executing each software event for testing the embedded software, a pulse width of the pulse identifying a software event.

13. The system of claim 12, wherein the pulse width is unique for each software event.

14. The system of claim 12, wherein a first software event comprises starting execution of a software path and a second software event comprises ending execution of the software path.

15. The system of claim 12, wherein the means for outputting the pulse comprises a timer configured for setting the pulse width for each software event.

16. The system of claim 15, wherein the means for executing comprises means for writing a value to the timer in response to executing each software event, and
wherein the timer is configured to start the pulse on the pin or pad in response to the means for executing writing the value, count down from the value, and end the pulse on the pin or pad in response to the count reaching zero.

17. A method for testing an integrated circuit, the method comprising:
executing software comprising a plurality of software events;
setting first pulse width in response to executing a first software event;
providing a first pulse having the first pulse width on a pad or pin of the integrated circuit in response to executing the first software event;
setting a second pulse width in response to executing a second software event; and
providing a second pulse having the second pulse width on the pad or pin in response to executing the second software event.

18. The method of claim 17, wherein setting the first pulse width comprises setting the first pulse width in response to executing a first software event comprising starting execution of a first software path, and
wherein setting the second pulse width comprises setting the second pulse width in response to executing a second software event comprising ending execution of the first software path.

19. The method of claim 18, further comprising:
setting a third pulse width in response to executing a third software event;
providing a third pulse having the third pulse width on the pad or pin in response to executing the third software event;
setting a fourth pulse width in response to executing a fourth software event; and
providing a fourth pulse having the fourth pulse width on the pad or pin in response to executing the fourth software event.

20. The method of claim 19, wherein setting the third pulse width comprises setting the third pulse width in response to executing a third software event comprising starting execution of a second software path, and
wherein setting the fourth pulse width comprises setting the fourth pulse width in response to executing a fourth software event comprising ending execution of the second software path.

21. The method of claim 17, wherein setting the first pulse width comprises setting a count of a timer to a first value, and
wherein providing the first pulse comprises:
outputting a logic high signal on the pad or pin in response to setting the count of the timer to the first value;
counting down the timer from the first count; and
outputting a logic low signal on the pad or pin in response to the count of the timer reaching zero.

22. A method for testing an integrated circuit, the method comprising:
executing embedded software comprising a plurality of software paths;
setting a first pulse width in response to starting execution of a first software path;
outputting a first pulse having the first pulse width on a pad or pin of the integrated circuit in response to setting the first pulse width;
setting a second pulse width in response to ending execution of the first software path; and
outputting a second pulse having the second pulse width on the pad or pin in response to setting the second pulse width.

23. The method of claim 22, further comprising:
setting a third pulse width in response to starting execution of a second software path;
outputting a third pulse having the third pulse width on the pad or pin in response to setting the third pulse width;
setting a fourth pulse width in response to ending execution of the second software path; and outputting a fourth pulse having the fourth pulse width on the pad or pin in response to setting the fourth pulse width.

24. The method of claim 23, further comprising:
determining whether the second pulse is terminated prior to setting the third pulse width, and
wherein setting the third pulse width comprises setting the third pulse width in response to determining that the second pulse is terminated, and waiting for the second pulse to be terminated before setting the third pulse width in response to determining that the second pulse is not terminated.

25. The method of claim 22, wherein setting the first pulse width comprises setting a count of a timer to a first value, and wherein providing the first pulse comprises:
outputting a logic high signal on the pad or pin in response to setting the count of the timer to the first value;
decrementing the count of the timer in response to each cycle of a clock signal; and
outputting a logic low signal on the pad or pin in response to the count of the timer reaching zero.

* * * * *